United States Patent
Clegg

[15] 3,700,336
[45] Oct. 24, 1972

[54] METHOD FOR OPTICALLY DETECTING LIGHTNING RADIATION

[72] Inventor: Robert J. Clegg, Auckland, New Zealand

[73] Assignee: The United States of America as represented by the Secretary of the Navy

[22] Filed: April 19, 1971

[21] Appl. No.: 134,933

[52] U.S. Cl. .................356/226, 250/212, 250/217
[51] Int. Cl. ..........................G01j 1/44, H01j 39/12
[58] Field of Search ....250/212, 214 P, 217; 356/226

[56] References Cited

UNITED STATES PATENTS

| | | | |
|---|---|---|---|
| 1,941,493 | 1/1934 | Ruben | 250/212 |
| 2,336,633 | 12/1943 | Parson, Jr. | 250/314 P |
| 3,601,652 | 8/1971 | Burnett, Jr. | 250/214 P |
| 3,057,254 | 10/1962 | Drury, Jr. | 356/226 X |

Primary Examiner—James W. Lawrence
Assistant Examiner—T. N. Grigsby
Attorney—R. S. Sciascia and Paul N. Critchlow

[57] ABSTRACT

The apparatus detects the optical radiation of lightning in both daylight and nighttime conditions. A silicon solar cell receives light radiations converting them to electrical signals which are amplified and electronically processed for recording purposes. Preferably, the electronics provide a thresholding means to selectively pass signals representative of lighting events to the recorder while blocking the relatively constant background radiation representative of the daylight.

4 Claims, 6 Drawing Figures

Patented Oct. 24, 1972

INVENTOR.
ROBERT J. CLEGG,
By [signature]
ATTORNEY.

Patented Oct. 24, 1972

INVENTOR.
Robert J. Clegg,
By [signature]
ATTORNEY.

3,700,336

METHOD FOR OPTICALLY DETECTING LIGHTNING RADIATION

BACKGROUND OF THE INVENTION

The present invention relates to optical detectors and, in particular, to detectors suitable for the study of lightning events.

There is at present somewhat of a controversy concerning the size and nature of clouds capable of producing electricity. For example, large-cloud electrification theories consider such environmental conditions as ice, hail, snow, freezing and melting as basic requirements for the production of lightning events. Another theory involving vertical convective motion has been proposed in which the low temperature phenomena are not considered as a necessary environmental condition, and in support of this theory electrification in warm clouds or, in other words, electrical charges on rain have been observed. Also there have been reports of lightning in small warm clouds and, at present, there is a program specifically directed at documenting such significant phenomena.

This program requires a lightning detector that can selectively detect lightning in one cloud cell in a region of extensive electrified activity during day or night. Several methods have been attempted such, for example, including the detection of electrical field variations, the detection of radio-frequency energy variations and the detection of optical radiation originating in the lightning flash. The detectors which sense electrical fields and RF energy tend to respond to signals from all direction and adequate direction sensing is particularly difficult when the signal occurs randomly and unpredictably. Optical detectors, of course, have directional properties and would be physically capable of providing the desired information. However, the only known optical detector other than simple visual observation is one that is described by L. E. Salanave and Max Brook in Journ. Geo. Res. 70, No. 6, p 1285. This detector employs a photomultiplier tube and a narrow band filter combination to select the H alpha from the total lightning radiation. Unfortunately this detector is expensive to construct largely due to its use of its high quality interference filter as well as a photomultiplier tube. In addition, its ability to meet the requirements of the program are rather marginal. There is a substantial need for a low cost, simple, reliable and effective instrument which can be made in substantial quantities and used at a number of selected geographical locations throughout the world.

OBJECTS OF THE INVENTION

A principal object is to provide apparatus for optically detecting lightning radiation against a daylight background as well as the more favorable nighttime conditions.

Another important object is to provide such apparatus in the form of a simple, inexpensive, effective and reliable instrument.

Still another object is to provide a detector in accordance with the foregoing objects, the detector utilizing a conventional photovoltaic silicon solar cell as its sensor.

A further object is to provide an apparatus capable of responding to transients due to irradiation by lightning even in the presence of a strong daylight background, and, correlatively, to provide a detector in which the transient response is such that it is capable of resolving lightning strokes within a flash.

Another important object is to provide a highly directional instrument as well as one which is sufficiently portable to be mounted on a low-cost camera tripod for aiming purposes.

Other objects and their attendant advantages will become more apparent in the ensuing detailed description which is to follow.

SUMMARY OF THE INVENTION

The apparatus includes a sensor in the form of a solar cell capable of converting input optical radiation into an electrical signal, the signal then being processed to provide an output selectively representative of the lightning radiation as opposed to the relatively steady background radiation, such as strong daylight. The signal processing may include amplifying means as well as filtering means for selectively passing the desired signal while blocking the relatively constant background radiation. In a preferred form, the filtering means is achieved by a thresholding technique that is sensitive to the relatively rapid rise time of the lightning radiation energy. To achieve directional aiming, the sensor and signal processing circuitry may be mounted in a casing which, in turn, can be pivotally and swingably mounted on an appropriate supporting member, such as a conventional camera tripod.

BRIEF DESCRIPTION OF THE DRAWINGS

The invention is illustrated in the accompanying drawings in which.

DETAILED DESCRIPTION OF THE INVENTION

Figure 1:
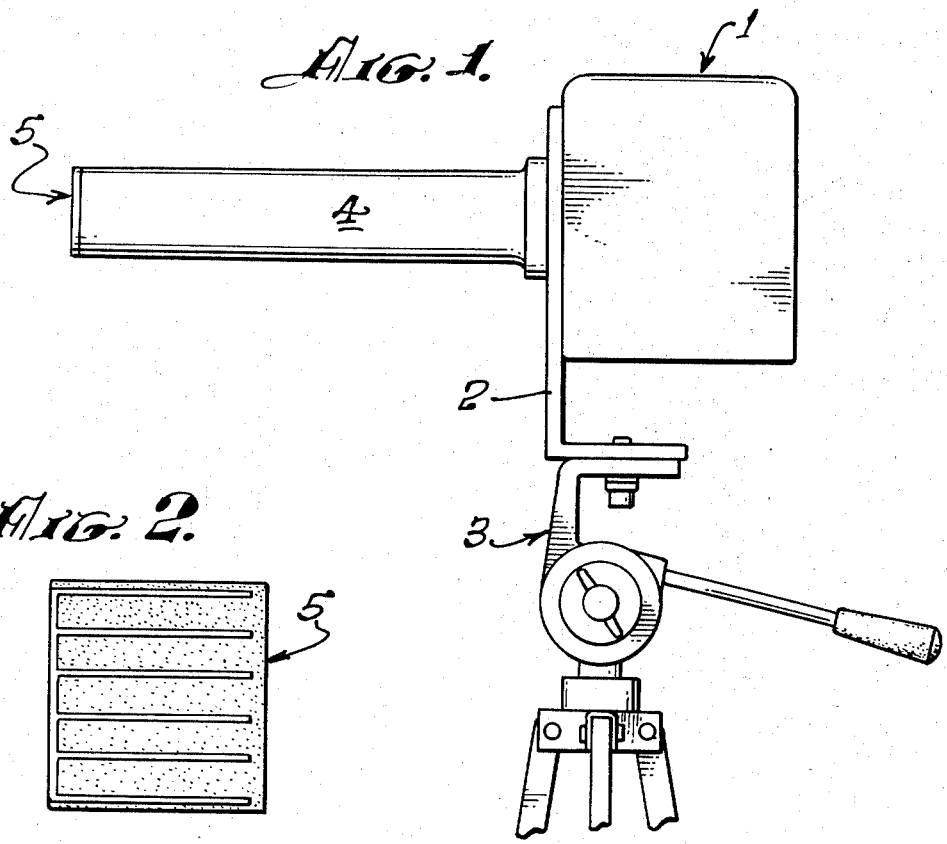
FIG. 1 is a side elevation of the detection apparatus mounted on a conventional tripod.
Figure 2:
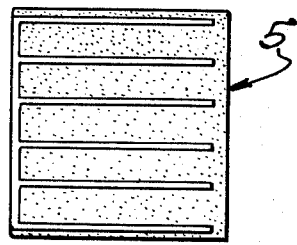
FIGS. 2 and 3 are somewhat diagrammatic face views of solar cell arrangements adapted for use in the detection apparatus of FIG. 1.
Figure 3:
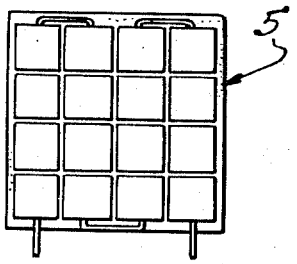

Referring to FIG. 1, the illustrated apparatus includes a casing 1 securely mounted by a bracket 2 to a pedestal support 3 which will be recognized as a conventional camera tripod. The tripod is swingable about both its vertical and horizontal axes to permit the casing to be aimed at a desired target, such as a single cloud. Casing 1 includes an elongate tubular member 4 and, to enhance the directional selectivity, a sensor element 5, such as those illustrated in FIGS. 2 and 3, is mounted in the outer end portion of this tube.

The principal novelty of the present invention resides in its use of a photovoltaic silicon solar cell as its sensor element and, as is known, such a cell utilizes the photovoltaic effect to produce electricity directly from sunlight or other radiation sources including the lightning radiation with which this invention is primarily concerned. These cells are available in a number of forms although for the most part they are composed of thin (about ½mm) layers of semiconductors, mostly commonly of N- or -P type. Usually they have an area of about 2 square cm and they yield relatively small voltages and currents. FIG. 2 illustrates a single cell as the sensing unit and such a cell is capable of providing reliable data. If desired, the embodiment of FIG. 3 may be substituted, this embodiment including a number of smaller cells combined in a suitable size to fit into the available aperture of detector tube 4. The plurality of cells makes it possible to adjust the detector sensing element to permit a wide range of sensitivities and internal impedances.

Figure 4:
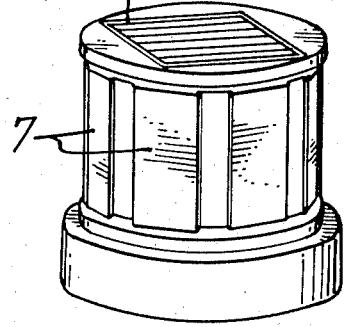
FIG. 4 represents another solar cell arrangement intended to provided an omnidirectional capacity.

The cell unit illustrated in FIG. 4 provides omnidirectional properties as contrasted with the highly directional nature of the tube-mounted sensor. As shown, the FIG. 4 unit includes a plurality of cells 6 and 7, cell 6 being mounted on the top wall of the unit so as to view a substantial sky area, while cells 7 are mounted on the sides of the unit in a radial disposition to view the horizon. Obviously, a variety of sensor cell arrangements may be employed depending upon the particular purposes for which the detection apparatus is being designed. Also the plurality of cells illustrated in FIG. 3 may be connected either in series or in parallel. If connected in series, the number of cells and their areas can be chosen to provide a very wide range of internal impedances and open circuit voltages for the composite cell thereby permitting a wide choice of subsequent electronics. A parallel connection can be employed using a current source amplifier, although this arrangement is not as convenient as the series arrangement.

Figure 5:
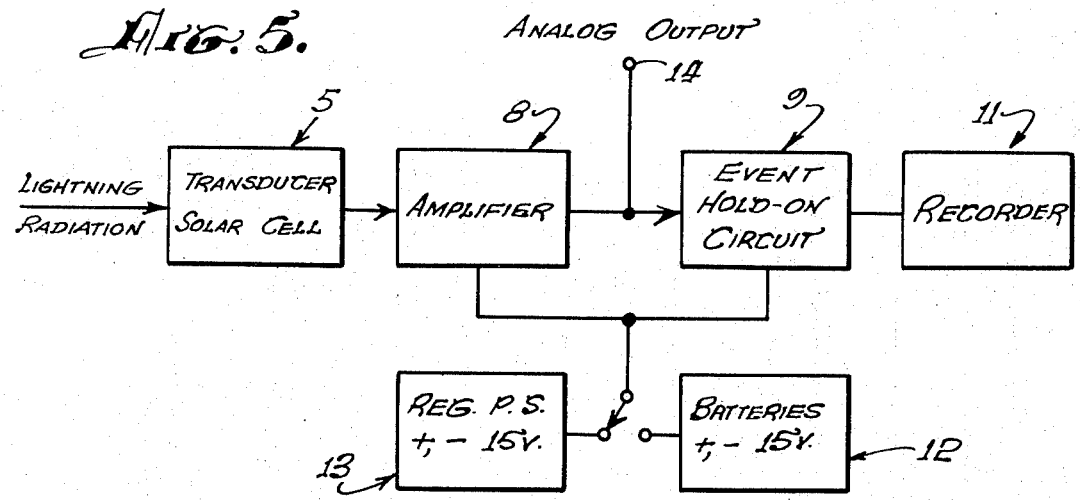
FIG. 5 is a block diagram of a detection system.
Figure 6:
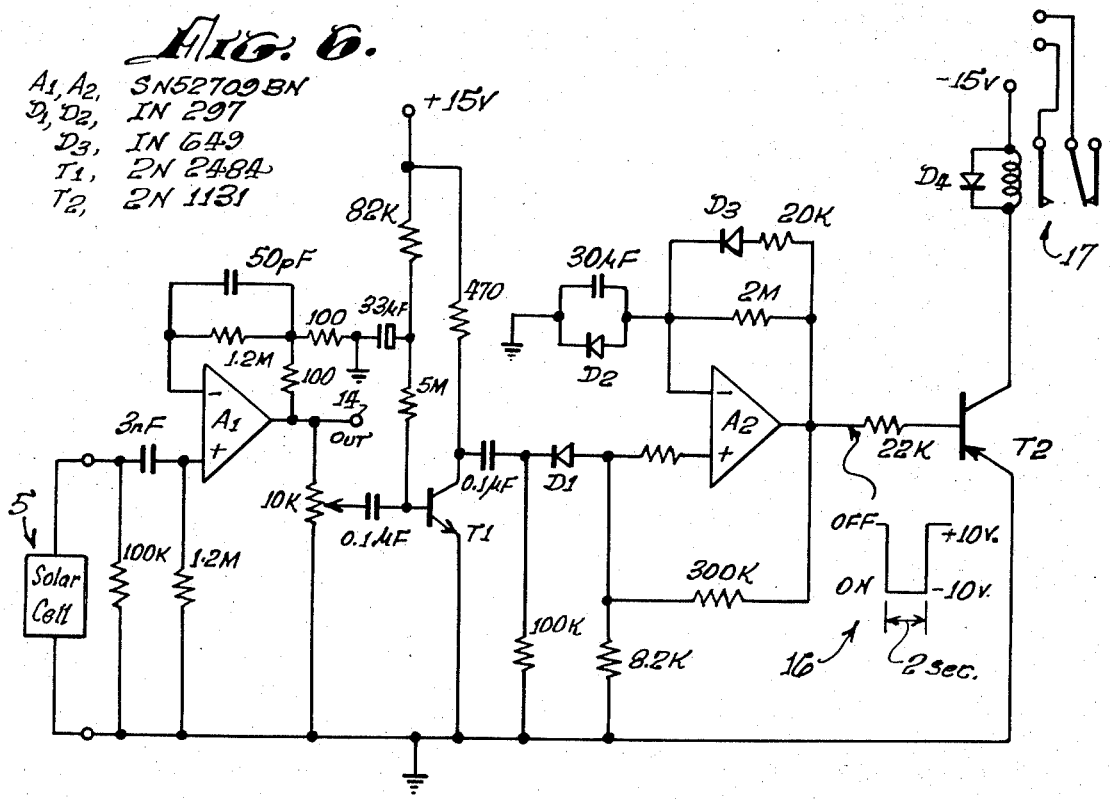
FIG. 6 is a circuit diagram illustrating one suitable implementation of the signal processing requirements.

One suitable implementation of the signal processing electronics is illustrated in FIGS. 5 and 6. However, as will be obvious, the electronics used to process the solar cell output is mostly a matter of individual choice which can vary widely depending upon the type of cell employed, the manner in which the output is to be recorded or displayed or, as a purely practical consideration, the cost and availability of components. The novelty of the present system appears to reside in its broader aspects or in other words, the broader concept of using a solar cell to derive the signal and the subsequent coupling of the cell output to a suitable recorder by any suitable processing techniques.

The system illustrated in FIG. 5 includes the previously identified solar cell 5 with its output applied to amplifier 8 which may be a voltage follower having low source resistance and adequate gain. As will be appreciated, background radiation, such as daylight, will generate primarily a DC output while the rapid lightning flash with its individual strokes produces the AC that is amplified. A so-called "hold-on" circuit 9 receives the amplified output, attenuates and produces a pulsed output which has a predetermined "on" time shown in FIG. 6 and subsequently described. The "on" time is to permit the output to be recorded by recorder 11 and, in this particular system, is used to energize a switch that couples the recorder. Power for the amplifier and other electronic solid-state components is provided either by batteries 12 or by a regualr power supply represented by block 13. An analog output terminal 14 provides a continuous output that can be observed or recorded, this continuous output being in contrast with the event output of recorded 11.

The circuitry of FIG. 6 is conventional and should need no detailed description. As already stated, its so-called "hold-on" components provide a pulsed output having a wave-form shown by numeral 16 of FIG. 6. As there seen, the pulse varies between +10 volts and −10 volts with an "on" time of two seconds at −10 volts. In effect, the processing includes a thresholding depending on the relatively rapid rise time of the AC signal so that the recorder is coupled in a selective manner that differentiates lightning events from relatively constant DC daylight responses.

Recorder 11 is not shown in FIG. 6 although it is coupled to the processor output through a conventional switch mechanism 17 which, as shown, is a solenoid type the coil of which is energized during the "on" time of pulse 16.

It again is emphasized that other circuitry is contemplated and, in fact, may be found advantageous. Thus, the relatively long "on" time is in part due to the type of switch and the intermittent nature of the recorder which accepts output limited to lightning events. Many other thresholding techniques can be used to distinguish lightning radiation signals from the slow daylight signals. In fact, the term 'thresholding' as presently used is intended to be broad enough to include filtering techniques such as the narrow-band filters of the prior art detectors. However, it is most desirable that the electronics function in what might be termed an unsaturated manner so that it will not saturate in direct sunlight. Further, it is highly desirable that the transient response of both the sensing element and the electronics be capable of resolving the individual, relatively rapid lightning strokes that occur within a lightning flash.

The principal advantages of the present detector are its reliability, sensitivity and, in contrast to the narrow-band approach, the fact that it operates in a broad spectral band over which most of the energy is radiated by lightning. Further, its components all are conventional, readily available and inexpensive as compared with the cost of H alpha filters, photomultiplier tubes and high voltage supplies. Another significant factor is that the components are lightweight and sturdy compared again with the relatively delicate components of the prior art optical detectors.

Obviously many modifications and variations of the present invention are possible in the light of the above teachings, It is therefore to be understood that within the scope of the appended claims the invention may be practiced otherwise than as specifically described.

I claim:

1. A method of obtaining a continuous day and night record of lightning radiation events comprising:
   continuously exposing a solar cell light-transducing means to the daylight and the dark,
   continuously recording the cell output, and
   continuously filtering said output to provide a record containing information limited essentially to said lightning events.

2. The method of claim 1 further including the step of collimating said continuous exposure to provide localized lightning event information.

3. The method of claim 1 wherein said filtering is achieved by an electronic thresholding based upon the rapid rise time of the lightning event cell output relative to the normal day and night cell output.

4. The method of claim 1 wherein said light-transducing means is a photovoltaic silicon solar cell.

* * * * *